Feb. 19, 1935.　　G. S. CAVANAUGH　　1,991,542
MEANS FOR PACKING BEARINGS
Filed Oct. 10, 1933
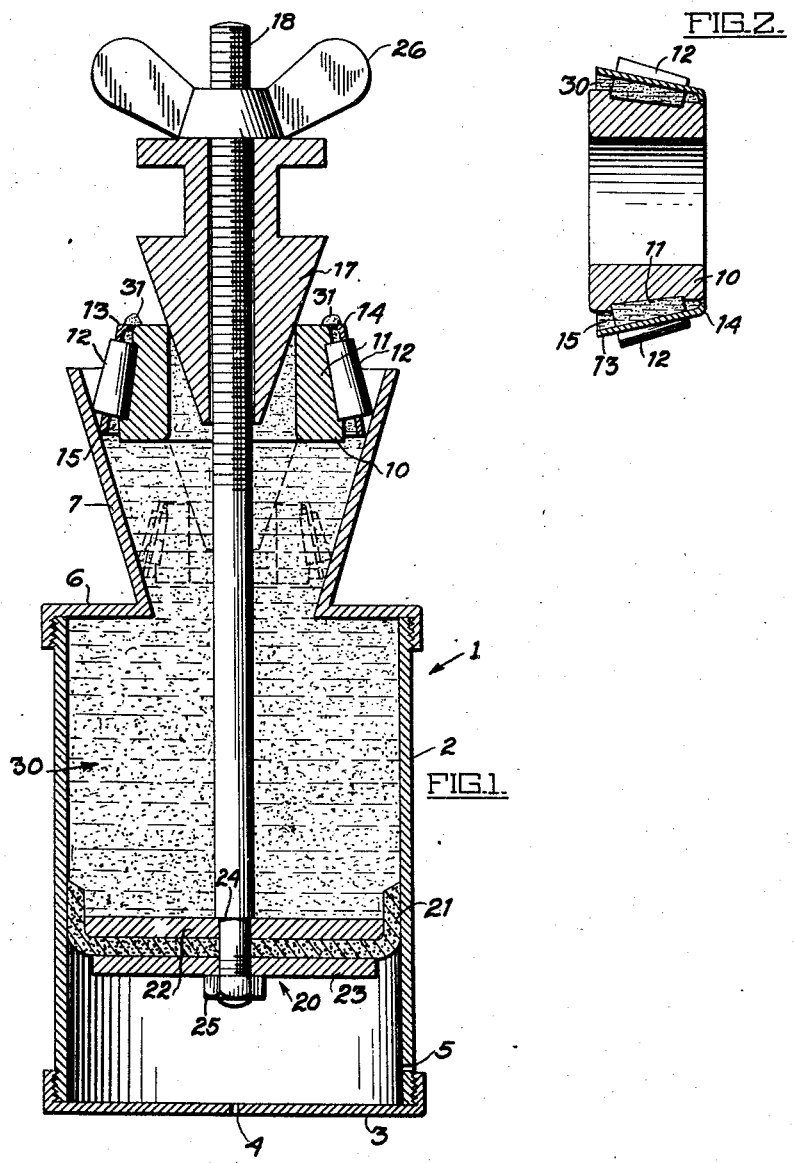
INVENTOR
GEORGE S. CAVANAUGH
BY
ATTORNEY Patented Feb. 19, 1935

1,991,542

UNITED STATES PATENT OFFICE 1,991,542

MEANS FOR PACKING BEARINGS

George S. Cavanaugh, Los Angeles, Calif.

Application October 10, 1933, Serial No. 692,953

13 Claims. (Cl. 221—47.4)

My invention relates to the art of lubricating bearings, being more particularly a means and method of packing roller bearings and the like with lubricant.

Roller bearings, of the type referred to herein, consist of a hollow body in the form of a ring having the rollers held thereon by means of a retaining ring. The space between the body and the retaining ring affords a space forming a reservoir for the lubricant, but as far as I am aware no advantage has been taken of this fact, as it has been common practice to merely smear lubricant on the exterior of the bearing member and place lubricant in the hub which receives the bearing member. When the parts are assembled the practice just referred to, as an example when used on automobile bearings, results in leakage of lubricant into the brakes.

It is the principal object of my invention to provide simple means and a method of packing bearings by forcing lubricant into the space between the retainer ring and the body ring of a bearing member.

Other objects and advantages will appear hereinafter from the following description and drawing.

Referring to the drawing, which is for illustrative purposes only,

Fig. 1 is a vertical sectional view of a preferred form of apparatus which may be employed for lubricating mearings in accordance with the method of my invention.

Fig. 2 is a sectional view of a bearing member showing the disposition of lubricant therein after the lubricating operation.

More particularly describing the invention as herein illustrated, reference numeral 1 designates a lubricant container consisting of a cylinder 2 closed at its lower end by a base 3 threaded on the cylinder, the base having an opening 4 therein and a similar opening 5 being formed in the cylinder.

The upper end of the cylinder 2 is provided with a screw cap or top 6 having formed centrally thereon a hollow frusto-conical member 7 in open communication with the cylinder 2.

The member 7 is formed with its circular walls diverging upwardly and outwardly to form a seating member to receive a bearing member as hereinafter described.

The bearing member herein referred to is of common form and consists of an inner cone or body member 10 in the form of a hollow ring. The outer face of the ring 10 is recessed as shown at 11 to receive rollers 12 retained therein by means of a retaining ring 13, one end of which is turned inwardly toward the ring 10 as indicated at 14. The retaining ring 13 co-operates with the ring 10 to form a lubricant receiving chamber 15. A bearing unit of one size is shown in full lines in Figure 1 with the edge of the retaining ring 13 seated in the member 7, the inner surface of which is preferably designed at a proper angle to engage such ring and clear the rollers and other portions of the bearing member.

Extending inwardly within the outer end of the bearing member is a conical clamping member 17, which I may term a plug or closure member. The walls of the closure member 17 engage the inner edge of the body ring 10 of the bearing member so as to form a closure for the opening therein.

Extending freely through a central bore in the conical clamping member 17 is a threaded stem or rod 18 which is provided at its lower end with a piston or plunger 20 consisting of a flexible cup member 21 engaging the inner walls of the cylinder 2 and disks 22 and 23 above and below the member 21, such members 21, 22 and 23 being secured against a shoulder 24 on the rod 18 by means of a nut 25.

Means are provided for clamping the member 17 in the bearing member and for moving the piston 20 in the cylinder which consists, in the form shown, of a butterfly nut 26 on the threaded outer end of the rod 18 in engagement with the upper end of the conical member 17.

It will readily be apparent from the above description and the drawing that the use of the conical member 17 and frusto-conical seating member 7 permit the use of the device described in packing bearing members of various sizes, a smaller size bearing member being shown in Fig. 1 in dotted lines.

In operation, lubricant indicated at 30 is placed in the container above the piston by removal of the cap or top 6, a roller bearing unit is then dropped into the conical chamber 7 with its largest diameter lowermost, the conical member 17 is then positioned on the stem as shown in Fig. 1, then by tightening the nut 26 which, as heretofore mentioned, clamps the conical member in the bearing member and moves the piston upwardly, the lubricant is forced into the lubricant reservoir in the bearing member.

The complete filling of the reservoir is indicated by extrusion of lubricant from the reservoir as indicated at 31, after which the bearing member may be removed by removal of the butterfly nut and the conical member 17.

By utilizing the space between the retaining ring and the inner or body ring of the bearing member as a lubricant reservoir, I have found that lubricant is uniformly supplied to the rollers as needed in proper amount without a temporary excess of lubricant in the hub and on the spindle as is the case where the bearings are lubricated as commonly done, and that from actual experience roller bearings packed by my method and placed in the wheels of automobiles will run approximately ten times as long as bearings lubricated in the conventional way. Furthermore, bearings packed in accordance with my invention will not extrude lubricant into the brakes as frequently occurs in automobile wheels with the conventional method of lubrication.

While I have shown and described one form of device for practising my invention, it is to be understood that such device may be modified without departing from the spirit of my invention which has as its principal elements means for holding a bearing member so that lubricant under pressure may be forced into the reservoir formed between the bearing ring and the inner or roller supporting member.

I claim as my invention:

1. A bearing member lubricating device comprising: a lubricant container; a frusto-conical seating member on said container in open communication with said container; closure means adapted to engage one end of a bearing member for holding the other end of said bearing member on said seating member; and means for forcing lubricant from said container into the bearing member.

2. A bearing member lubricating device comprising: a lubricant container; a frusto-conical seating member on said container in open communication with said container; closure means adapted to engage one end of a bearing member for holding the other end of said bearing member on said seating member; a piston in said container; and means for operating said piston to discharge lubricant from said container into the bearing member.

3. A bearing member lubricating device comprising: a lubricant container; a frusto-conical seating member on said container in open communication with said container arranged to receive a bearing member therein; a conical closure member engaging the outer end of the bearing member; and means for forcing lubricant from said container into the bearing member.

4. A bearing member lubricating device comprising: a lubricant container; a frusto-conical seating member on said container in open communication with said container arranged to receive a hollow bearing assembly therein; closure means engaging the outer end of the bearing assembly and closing the opening therethrough; and means for forcing lubricant from the container into the bearing assembly.

5. A bearing member lubricating device comprising: a lubricant container; a frusto-conical seating member on said container in open communication with said container arranged to receive a bearing member therein; a conical member engaging within the bearing member; a piston within the container below the lubricant therein; a rod on said piston extending through said conical member; and means on said rod engaging the outer face of the conical member for moving said piston and holding the conical member in engagement with the bearing member.

6. A bearing member lubricating device comprising: a lubricant container having a discharge opening arranged to receive a bearing member; a clamping member engaging the outer portion of the bearing member; a piston in said container; a rod on said piston extending through the clamping member; and means on said piston rod engaging said clamping member for moving said piston and holding said clamping member in engagement with the bearing member.

7. A bearing member lubricating device comprising: a lubricant container having a discharge opening arranged to receive a bearing; a conical member extending into the outer end of the bearing into engagement therewith; a piston in said container; a threaded rod on said piston extending freely through said conical member; and a nut on the outer end of said rod engaging the outer face of said conical member.

8. For use in combination with a bearing member consisting of a hollow bearing supporting ring and a retaining ring for the bearings, a lubricating device comprising: a lubricant container having a discharge opening; closure means for closing the opening through said supporting ring and holding said bearing member over said discharge opening whereby lubricant may flow from the container into the space between said retaining ring and said supporting ring; and means for forcing lubricant from the container into such space between the retaining ring and the supporting ring.

9. A bearing member lubricating device comprising: a frusto-conical seating member for one end of the bearing, said seating member having an inlet opening for lubricant, closure means engaging the other end of the bearing for holding said bearing member on the seating member, and means for forcing lubricant through said inlet into the bearing member.

10. A device for forcing lubricant into the space between the inner and outer rings of a hollow bearing assembly embodying: an open seating member adapted to engage one end of the outer ring of said bearing assembly; a closure member adapted to engage the other end of the inner ring of said bearing assembly, thereby closing the passage therethrough; means for clamping said bearing assembly between said seating member and said closure member; and means for forcing lubricant through the opening in said seating member into the space between said inner and outer rings.

11. A device for forcing lubricant into the space between the inner and outer rings of a hollow bearing assembly embodying: an open seating member adapted to engage the outer ring of said bearing assembly; means for closing the passage through the inner ring of said bearing assembly and holding said bearing assembly on said seating member; and means for forcing lubricant through the opening in said seating member into the space between said inner and outer rings.

12. A device for forcing lubricant into the space between the inner and outer rings of a hollow bearing assembly embodying: a frusto-conical seating member adapted to engage the outer ring of a bearing assembly and having a lubricant passage therethrough; means for closing the passage through the inner ring of said bearing assembly and holding said bearing assembly on said seating member; and means for forcing lubricant through the passage in said seating member into the space between said inner and outer rings.

13. A device for forcing lubricant into the space between the inner and outer rings of a hollow bearing assembly embodying: a hollow seating member adapted to engage the outer ring of said bearing assembly; a closure plug for the inner ring of said bearing assembly; means for clamping said bearing assembly between said seating member and said closure plug; and means for forcing lubricant through the hollow seating member into the space between the inner and outer rings of said bearing assembly.

GEORGE S. CAVANAUGH.